United States Patent
Kubota

(10) Patent No.: US 8,976,109 B2
(45) Date of Patent: Mar. 10, 2015

(54) CONTENT OUTPUT SYSTEM, OUTPUT CONTROL DEVICE AND OUTPUT CONTROL METHOD

(75) Inventor: Hirotaka Kubota, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 448 days.

(21) Appl. No.: 13/226,544

(22) Filed: Sep. 7, 2011

(65) Prior Publication Data

US 2012/0056803 A1 Mar. 8, 2012

(30) Foreign Application Priority Data

Sep. 8, 2010 (JP) .................................. 2010-201251

(51) Int. Cl.
*G09G 5/00* (2006.01)
*H04N 5/77* (2006.01)

(52) U.S. Cl.
CPC ....................................... *H04N 5/77* (2013.01)
USPC .......................................................... 345/156

(58) Field of Classification Search
CPC ...... H04N 5/23219; G06F 3/011; G09F 21/00
USPC .......................................................... 345/156
See application file for complete search history.

(56) References Cited

U.S. PATENT DOCUMENTS

| | | | |
|---|---|---|---|
| 2006/0044446 A1* | 3/2006 | Porter et al. | 348/333.11 |
| 2008/0152193 A1* | 6/2008 | Takamori | 382/103 |
| 2009/0284714 A1* | 11/2009 | Kogo et al. | 353/48 |
| 2010/0232644 A1* | 9/2010 | Hsiao et al. | 382/103 |
| 2010/0253778 A1* | 10/2010 | Lee et al. | 348/143 |
| 2010/0259473 A1* | 10/2010 | Sakata et al. | 345/156 |
| 2011/0128283 A1* | 6/2011 | Lee et al. | 345/420 |
| 2011/0293148 A1 | 12/2011 | Kobayashi | |

FOREIGN PATENT DOCUMENTS

| | | |
|---|---|---|
| JP | 2005-157134 A | 6/2005 |
| JP | 2006-235311 A | 9/2006 |
| JP | 2010-102235 A | 5/2010 |
| JP | 2011-8571 A | 1/2011 |
| JP | 2011-248548 A | 12/2011 |

OTHER PUBLICATIONS

Kato et al., "Realtime Human Tracking Using Ellipsoid Model," Journal of Information Society of Japan, Nov. 15, 1999, vol. 40, No. 11, p. 4087-4096.

* cited by examiner

*Primary Examiner* — Viet Pham
(74) *Attorney, Agent, or Firm* — Birch, Stewart, Kolasch & Birch, LLP

(57) ABSTRACT

Based on captured images obtained when an image capture device takes images in an image capture range, a change in the moving speed of one passerby or each of a plurality of passerby contained in the captured images is calculated. When there is a passerby whose moving speed is decreased in the image capture range, the passerby is paying attention to the content, and therefore content to be outputted by a content output device is switched from ordinary content to specific content. On the other hand, when only passerby who are moving at constant speed are present in the image capture range, the passerby are not paying attention to the content, and hence the content output device continues to output the ordinary content.

8 Claims, 10 Drawing Sheets

F I G. 4 A
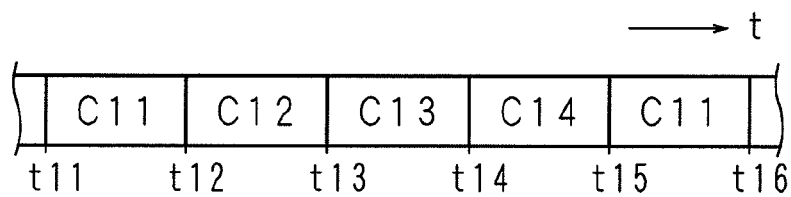
F I G. 4 B
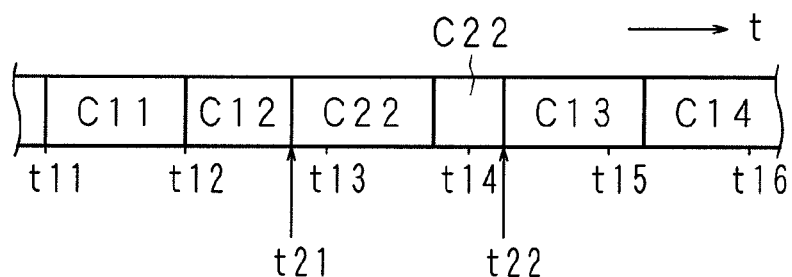
F I G. 4 C
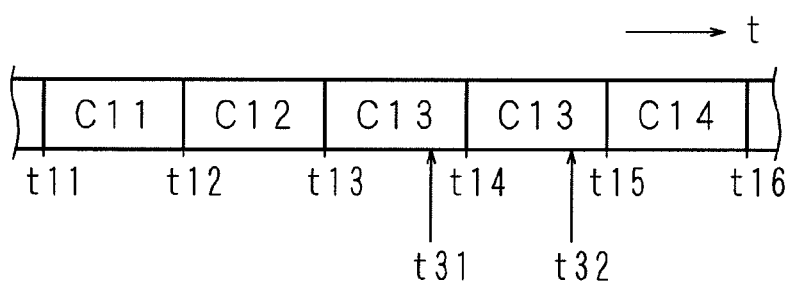

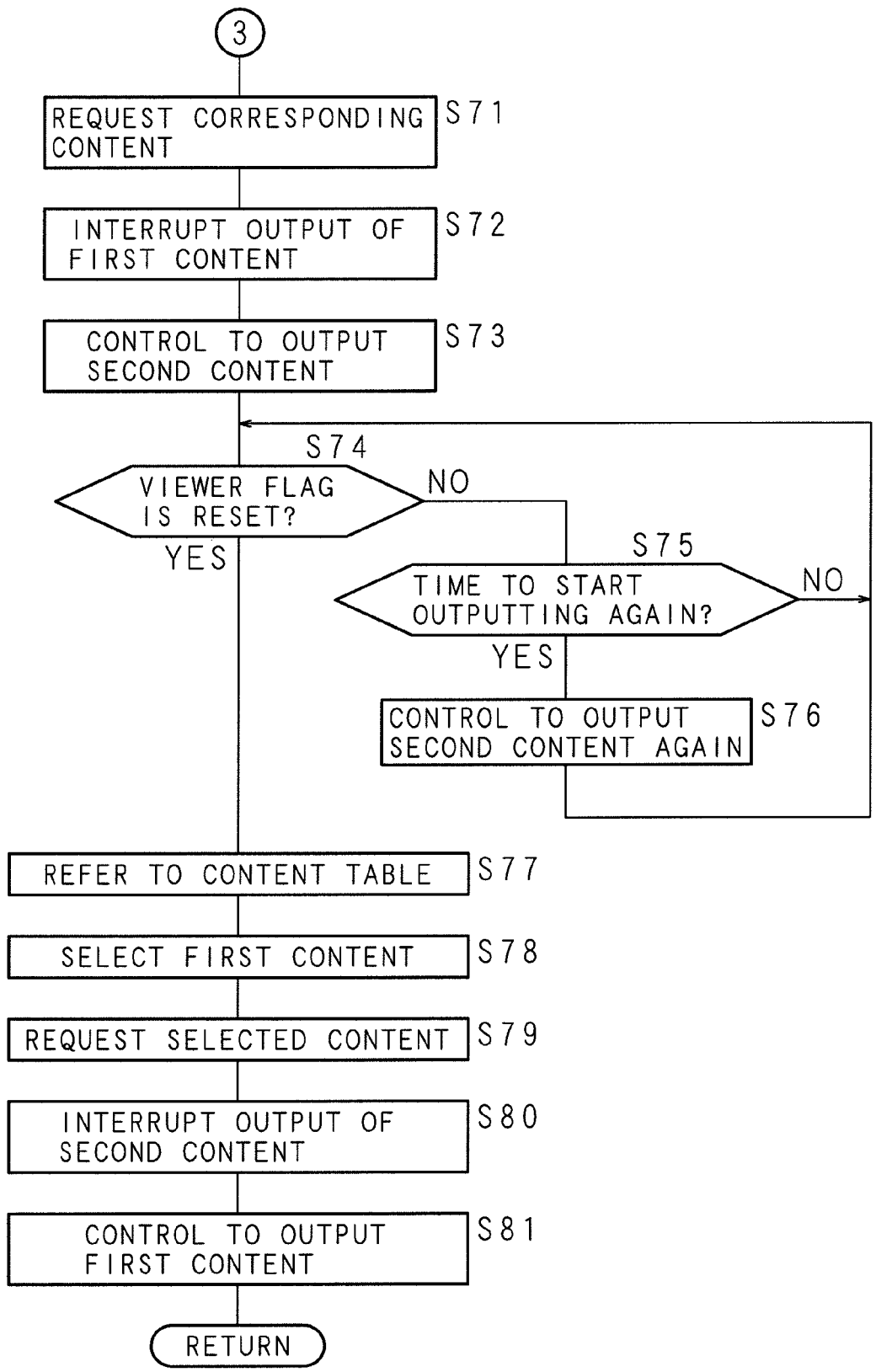

FIG. 8

| FIRST CONTENT | C11 | C12 | C13 | C14 |
|---|---|---|---|---|
| NUMBER OF VIEWERS | N1 | N2 | N3 | N4 |
| FACE IMAGE | I11<br>I12<br>⋮ | I21<br>I22<br>⋮ | I31<br>I32<br>⋮ | I41<br>I42<br>⋮ |

CONTENT OUTPUT SYSTEM, OUTPUT CONTROL DEVICE AND OUTPUT CONTROL METHOD

CROSS-REFERENCE TO RELATED APPLICATION

This non-provisional application claims priority under 35 U.S.C. §119(a) on Patent Application No. 2010-201251 filed in Japan on Sep. 8, 2010, the entire contents of which are hereby incorporated by reference.

BACKGROUND

1. Technical Field

The present invention relates to a content output system for outputting content, and an output control device and an output control method for controlling the switching and outputting of content.

2. Description of Related Art

Digital signage (electronic signage) is an advertising medium using digital technology and outputs content as, for example, an advertisement for commercial purposes to a content output device installed in a shop or public space etc. Content to be outputted by the content output device is statically or dynamically changed according to the location where the content output device is installed, the current time, or whether or not there are passerby near the content output device. In the case where the content is statically changed, for example, the output control device in the content output device switches a plurality of pieces of content sequentially and causes the content output device to output the content.

In the case where the content is dynamically changed, for example, the output control device of the content output device obtains an image from an image capture device for capturing images in the vicinity of the content output device (hereinafter referred to as the captured image), performs human recognition processing on the obtained captured image to detect whether or not there are passerby or detect the number of passerby, switches a plurality of pieces of content according to the result of the human recognition processing, and causes the content output device to output the content. In addition, if passerby's face recognition processing is performed together with the human recognition processing, detailed information about the passerby (for example, sex or age group of the passerby) is obtained. In this case, content is appropriately changed according to the obtained information, and the obtained information is collected to facilitate the evaluation of the advertising effect.

Other example of changing dynamically the content is an information output device which detects the moving speed of a passerby and switches the content according to the detected moving speed (see Japanese Patent Application Laid-Open No. 2006-235311). There is a high possibility that passerby who are moving at a low speed pay attention to content, while there is a low possibility that passerby who are moving at a high speed pay attention to content. Hence, the information output device disclosed in Japanese Patent Application Laid-Open No. 2006-235311 switches the content according to whether or not there is a high possibility that passerby are paying attention to the content. As a result, the advertising effect of the content is improved.

By the way, real-time human tracking technology in an indoor known environment has been conventionally proposed (see "Real-time Human Tracking Using Ellipsoid Model", Hirokazu Kato, Atsushi Nakazawa, and Seiji Inokuchi, Journal of Information Society of Japan, Vol. 40, No. 11, p. 4087-4096).

SUMMARY

However, the moving speeds of passerby are different from individual to individual. Therefore, it is not sure that passerby who are moving slowly are definitely paying attention to content, and there is a possibility that they are just walking in front of the content output device. On the other hand, there is also a possibility that passerby who are moving fast are paying attention to content. Thus, the information output device disclosed in Japanese Patent Application Laid-Open No. 2006-235311 may have a problem that appropriate content is not outputted to the content output device.

In order to solve such a problem, it is considered to perform face recognition processing on a captured image. In this case, it is possible to accurately determine whether or not the face of a passerby is facing the content output device, that is, whether or not the passerby is paying attention to the content. However, the procedure of the face recognition processing is generally complicated, and therefore the computational load is extremely high especially when there are many passerby.

The present invention has been made with the aim of solving the above problems, and it is an object of the present invention to provide a content output system, an output control device and an output control method capable of outputting appropriate content according to whether or not passerby are paying attention to content by switching a plurality of pieces of content according to a change in the moving speed of people contained in the captured images and outputting the content.

A content output system according to the present invention is a content output system comprising: an image capture device; a storage device storing a plurality of pieces of content; a content output device for outputting content stored in the storage device; and an output control device for controlling the content output device to switch and output the content, based on images which are captured by the image capture device and inputted in a time sequence to the output control device, wherein the output control device includes: a human determination section for determining, based on the images, whether or not the images contain a person; a change calculation section for calculating, when the human determination section determines that the images contain a person, a change in a moving speed of the person contained in the images; and an output control section for selecting content according to a result of calculation by the change calculation section and a result of determination by the human determination section from the content stored in the storage device and causing the content output device to output the selected content.

An output control device according to the present invention is an output control device for controlling switching and outputting of a plurality of pieces of content in an external device, based on images which are inputted in a time sequence to the output control device, and comprising: a human determination section for determining, based on the images, whether or not the images contain a person; a change calculation section for calculating, when the human determination section determines that the images contain a person, a change in a moving speed of the person contained in the images; and an output control section for selecting and outputting content according to a result of calculation by the change calculation section and a result of determination by the human determination section.

An output control method according to the present invention is an output control method for controlling an output control device to switch and output a plurality of pieces of content in an external device, based on images which are inputted in a time sequence to the output control device, comprising the steps of: when the images contain a person, calculating a change in a moving speed of the person contained in the images, and selecting and outputting content according to a result of calculation of the change and whether or not the images contain person.

According to the present invention, the output control device comprises the human determination section, the change calculation section, and the output control section. Such an output control device implements an output control method of the present invention and configures a content output system of the present invention with the image capture device, the storage device, and the content output device. Further, a computer program according to the present invention implements various sections of the output control device of the present invention by software with the use of hardware components of a computer.

For example, the image capture device takes an image in a range where a person near the content output device is capable of viewing content (still images, animated images, and/or sounds etc.) outputted by the content output device. The range where the image capture device takes an image is hereinafter referred to as the image capture range.

Images taken by the image capture device are inputted in a time sequence to the output control device. The output control device controls the content output device to switch and output content, based on the inputted images. Hence, the human determination section of the output control device determines, based on the inputted images, whether or not the inputted images contain a person. If the inputted images contain (or do not contain) a person, the person capable of viewing the content is present (or absent). The person capable of viewing the content will be referred to as the "possible viewer". In general, the possible viewer is passerby walking in the image capture range, and a possible viewer who is interested in the content pays attention to the content, but a possible viewer who is not interested in the content does not pay attention to the content. In the case where a possible viewer is paying attention to the content outputted by the content output device, there is a high possibility that the possible viewer decreases the moving speed, or stops walking, in the image capture range. On the other hand, there is a low possibility that a possible viewer who has no intention to pay attention to the content outputted by the content output device decrease the moving speed or stop walking in the image capture range.

Such a tendency is hardly influenced by the level of the moving speed of the possible viewer. Thus, a change in the moving speed of possible viewer faithfully reflects whether or not the possible viewer is paying attention to the content as compared to the moving speed itself of the possible viewer.

Hence, when the human determination section determines that the inputted images contain a person, the change calculation section calculates a change in the moving speed of the possible viewer contained in the inputted images. Here, the calculation processing performed by the change calculation section is simpler than the face recognition processing, for example, and the computational load is smaller. Further, the output control section selects content according to a result of calculation by the change calculation section (that is, an index indicating whether a possible viewer is paying attention to the content) and a result of determination by the human determination section (that is, whether or not a possible viewer is present) from a plurality of pieces of content stored in the storage device, and causes the content output device to output the content.

As a result, appropriate content according to the situation in the image capture range is outputted by the content output device.

In the present invention, appropriate content is provided to the possible viewer according to whether or not there is a possible viewer in the image capture range, or, if a possible viewer is present, according to whether or not the possible viewer is paying attention to the content. Moreover, since a determination as to whether or not the possible viewer is paying attention to the content is made based on a change in the moving speed of the possible viewer, it is possible to more accurately determine whether or not the possible viewer is paying attention to the content as compared to the case where the determination is made based on the moving speed of the possible viewer. Furthermore, the process of determining whether or not the possible viewer is paying attention to the content is simpler as compared to, for example, the face recognition processing. Consequently, even when many possible viewers are present, the problem of an increase in the computational load is reduced.

An output control device according to the present invention further comprises a speed determination section for determining whether or not a result of calculation by the change calculation section indicates a decrease in the moving speed, wherein the output control section includes a first output section for outputting first content when the human determination section or the speed determination section determines "NO", and a second output section for outputting second content different from the first content, instead of the first content, when the speed determination section determines that a result of calculation by the change calculation section indicates a decrease in the moving speed for at least one person.

When a possible viewer decreases the moving speed or stops walking, the result of calculation by the change calculation section indicates a decrease in the moving speed. On the other hand, when a possible viewer does not decrease the moving speed or stop walking, the result of calculation by the change calculation section indicates an increase in the moving speed, or indicates that the moving speed exceeding a moving speed of "0" is maintained. Thus, when the speed determination section determines that the result of calculation by the change calculation section indicates a decrease in the moving speed, there is a possible viewer who is paying attention to the content (hereinafter referred to as the viewer). On the other hand, when the speed determination section determines "NO" (or that the result of calculation by the change calculation section does not indicate a decrease in the moving speed), there is a possible viewer who is not paying attention to the content.

Therefore, when the human determination section determines "NO" (or that the inputted images do not contain a person), or when the speed determination section determines "NO", the output control section causes the content output device to output the first content. On the other hand, when the speed determination section determines that the result of calculation by the change calculation section indicates a decrease in the moving speed for at least one possible viewer, the output control device causes the content output device to output the second content instead of the first content.

As a result, the output control device is capable of causing the content output device to output optimum content according to the situation in the image capture range.

More specifically, when there are no possible viewers in the image capture range, or when only possible viewers who are not paying attention to the content are present, the content output device outputs the first content under the control of the output control device. Here, the first content is preferably content which attracts people outside the image capture range, and possible viewers who are not paying attention to content. On the other hand, when at least one viewer is present, the content output device outputs the second content under the control of the output control device. Here, the second content is preferably content which is to be provided particularly to the viewer.

In an output control device according to the present invention, when a result of calculation by the change calculation section indicates a decrease equal to or more than a given percentage of the moving speed, the speed determination section determines that the result of calculation by the change calculation section indicates a decrease in the moving speed.

In the present invention, when a result of calculation by the change calculation section indicates a decrease equal to or more than the given percentage of the moving speed (that is, a significant decrease in the moving speed of a possible viewer), the speed determination section determines that the result of calculation by the change calculation section indicates a decrease in the moving speed. On the other hand, when a result of calculation by the change calculation section indicates a decrease less than the given percentage of the moving speed (that is, a slight decrease in the moving speed of a possible viewer), the speed determination section determines that the result of calculation by the change calculation section does not indicate a decrease in the moving speed. The reason for this is that even when a possible viewer who is not interested in the content being outputted by the content output device sometimes decreases the moving speed slightly for reasons irrelevant of the content, but a possible viewer who is interested in the content being outputted by the content output device tends to decrease the moving speed significantly to focus on the content.

As a result, the output control device is capable of reducing the problem of providing the second content to a possible viewer who is not paying attention to the content.

An output control device according to the present invention further comprises: a distance calculation section for calculating, when the human determination section determines that the images contain a person, a distance from a given position to the person; and a distance determination section for determining whether or not a result of calculation by the distance calculation section is equal to or less than a given distance, wherein when the distance determination section determines that a result of calculation by the distance calculation section is equal to or less than the given distance for the person, the change calculation section executes the calculation.

When the human determination section determines that the inputted images contain a person, the distance calculation section calculates a distance from the given position to the possible viewer. Here, the given position is, for example, the installation position of the content output device, or a position where the possible viewer can most easily view the content being outputted by the content output device. Next, the distance determination section determines whether or not a result of calculation by the distance calculation section is equal to or less than the given distance.

When the result of calculation by the distance calculation section is equal to or less than the given distance, that is, when the distance from the given position to the possible viewer is short, there is a high possibility that the possible viewer is paying attention to the content. Therefore, when a possible viewer near the given position decreases the moving speed or stops walking, there is a very high possibility that the possible viewer is paying attention to the content. Hence, for a possible viewer for which the distance determination section determines that the result of calculation is equal to or less than the given distance, the change calculation section calculates a change in the moving speed of the possible viewer contained in the inputted images.

On the other hand, when the result of calculation by the distance calculation section exceeds the given distance, that is, when the distance from the given position to the possible viewer is long, there is a low possibility that the possible viewer is paying attention to the content. Thus, even when a possible viewer located far from the given position decreases the moving speed or stops walking, there is a very low possibility that the possible viewer is paying attention to the content. The reason for this is that possible viewers who are interested in the content should come closer to the given position and view the content rather than viewing the content from distance. Hence, it is no problem to ignore possible viewers who are located far from the given position.

Therefore, the change calculation section does not calculate a change in the moving speed for a possible viewer for which the distance determination section determines "NO" (that is, a result of calculation by the distance calculation section exceeds the given distance), or in other words, a possible viewer who is regarded as not paying attention to the content without calculating a change in the moving speed. In short, the output control device can omit the useless calculation process.

As a result, the output control device is capable of accurately determining whether or not a viewer is present while reducing the computational load.

An output control device according to the present invention further comprises a recording section for recording, when there is a person for which a result of calculation by the change calculation section indicates a decrease in the moving speed, viewing information about viewing of content by the person.

When there is a possible viewer for which a result of calculation by the change calculation section indicates a decrease in the moving speed (that is, a possible viewer who is paying attention to the content, and the possible viewer who is paying attention to the content will also be referred to hereinafter as the viewer), the recording section records viewing information about viewing of content by this viewer. Here, the viewing information is preferably an index indicating the degree of the advertising effect of the content, for example, information indicating the number of viewers. In this example, the output control device is capable of counting only the number of viewers among possible viewers rather than the number of the possible viewers. In short, the output control device is capable of collecting viewing information which contributes to accurate evaluation of the advertising effect of content.

An output control device according to the present invention further comprises a face recognition section for recognizing the face of a person for which a result of calculation by the change calculation section indicates a decrease in the moving speed, based on images inputted, wherein the recording section includes information based on a result of recognition by the face recognition section in the viewing information to be recorded.

The face recognition section recognizes the face of a possible viewer for which a result of calculation by the change calculation section indicates a decrease in the moving speed (that is, a viewer), based on the inputted images. In other words, the face recognition section does not recognize the face of a possible viewer who did not pay attention to content among possible viewers. In short, since there is no need to execute the face recognition processing for all the possible viewers, the complex face recognition processing is completed in a relatively short time.

Further, the recording section includes information based on the result of recognition by the face recognition section in the viewing information to be recorded. This information is preferably an index indicating the degree of the advertising effect of content, for example, information indicating sex or age group etc. of viewers, or partial images etc. obtained by cutting out only an area containing the faces of viewers from the inputted images.

As a result, the output control device further contributes to accurate evaluation of the advertising effect of content without wastefully performing calculation for a long time.

The above and further objects and features of the invention will more fully be apparent from the following detailed description with accompanying drawings.

BRIEF DESCRIPTION OF THE SEVERAL VIEWS OF THE DRAWINGS

FIGS. 4A-4C are conceptual views for explaining the switching and outputting of content by the content output system according to Embodiment 1 of the present invention;

FIGS. 6A and 6B are a flowchart showing the procedure of output control processing to be executed by the output control device according to Embodiment 1 of the present invention;

FIG. 8 is a schematic view illustrating one example of a viewing record DB (database) stored on an HDD in an output control device according to Embodiment 2 of the present invention.

DETAILED DESCRIPTION

The following description will explain in detail the present invention, based on the drawings illustrating some embodiments thereof.

Embodiment 1

Figure 1:
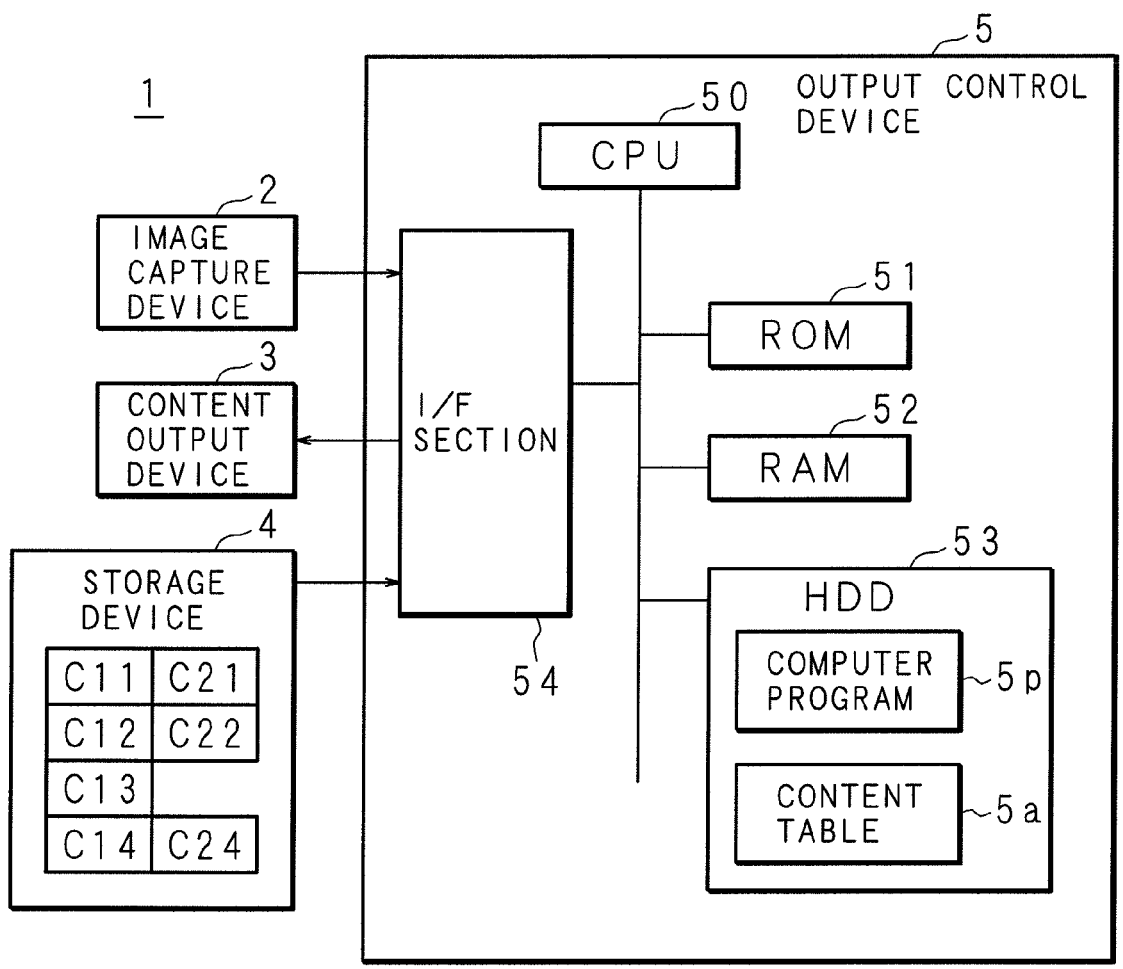
FIG. 1 is a block diagram illustrating the configuration of a content output system according to Embodiment 1 of the present invention.

FIG. 1 is a block diagram illustrating the configuration of a content output system 1 according to Embodiment 1 of the present invention. The content output system 1 comprises an image capture device 2, a content output device 3, a storage device 4, and an output control device 5. Although this embodiment illustrates the case where the content output system 1 is used in a shop, the present invention is not limited to this.

Figure 2A:
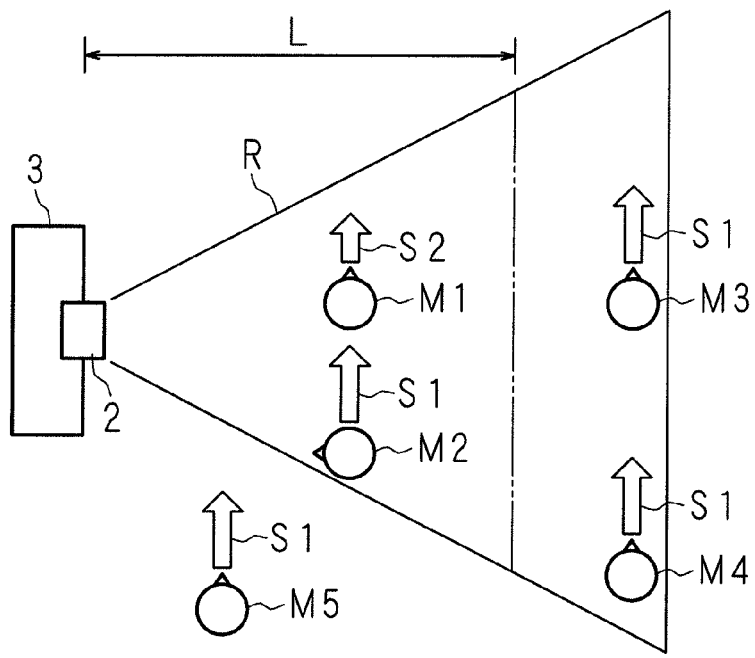
FIGS. 2A and 2B are conceptual views for explaining the recognition of viewers by the content output system according to Embodiment 1 of the present invention.
Figure 2B:
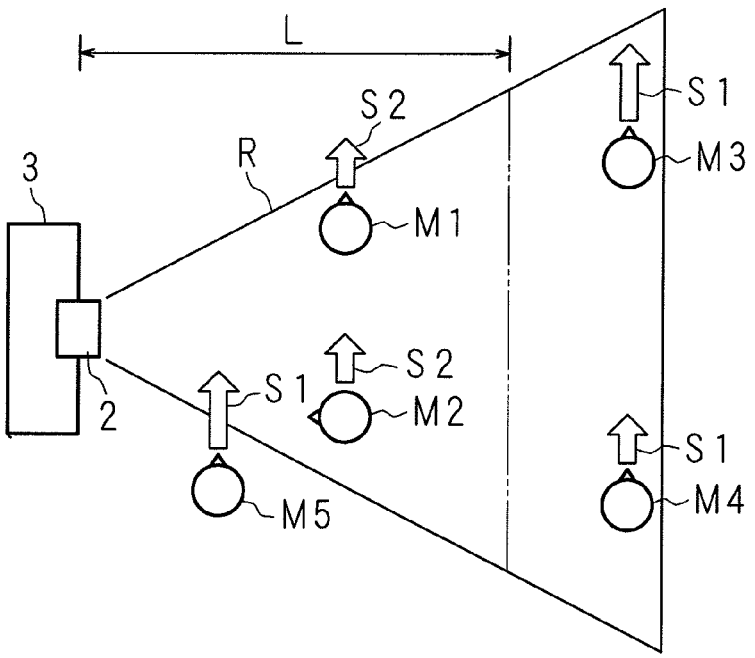

FIGS. 2A and 2B are conceptual views for explaining the recognition of viewers by the content output system 1, and are schematic plan views illustrating five passerby M1-M5 walking on a street, and the image capture device 2 and the content output device 3 installed in a shop facing the street.

The length (long/short) of thick arrows S1 and S2 in FIGS. 2A and 2B indicates the moving speed (high/low) of each of the passerby M1-M5. More specifically, the long thick arrow S1 means a high moving speed at which it is difficult for the passerby to view the content being outputted by the content output device 3 while moving at that speed, and the short thick arrow S2 means a low moving speed at which it is easy for the passerby to view the content being outputted by the content output device 3 while moving at that speed. FIG. 2A illustrates the state of each of the passerby M1-M5 at a first time, and FIG. 2B shows the state of each of the passerby M1-M5 at a second time later than the first time.

The content output device 3 comprises a liquid crystal display and a speaker, and outputs content including video and sound. The content output device 3 is installed in a shop in such a manner that the display screen of the liquid crystal display and the sound output section of the speaker face the street. Note that the content output device 3 may be configured using a plasma display instead of a liquid crystal display, without a speaker.

Content outputted by the content output device 3 is advertisement for commercial purposes, and is more specifically distinguished into first content and second content. The first content is content which is outputted irrespective of whether or not a possible viewer is present. The second content is content which is outputted only when a viewer is present. Thus, the first content is preferably content which attracts a possible viewer who is passively viewing content, and, for example, includes a video showing a subject of advertising content written in large letters, and loud sound effects etc. On the other hand, the second content should be provided particularly to a possible viewer who is actively viewing the content (that is, viewers), and, for example, includes a video showing the details of advertising content written in small letters, and specific message sounds etc.

The first content and the second content will be hereinafter referred to simply as content unless otherwise they need to be distinguished from each other.

Note that the content is not limited to advertisement for commercial purposes. The first content and the second content may be distinguished from each other according to whether or not they use static images or dynamic images, or whether they output sounds.

The image capture device 2 includes a digital still camera and is installed together with the content output device 3 in a shop. The image capture device 2 repeatedly takes an image in a given image capture range R as shown in FIGS. 2A and 2B at certain time intervals and outputs in a time series the taken images (hereinafter referred to as the captured images) to the output control device 5. Note that the image capture device 2 may also be configured using a digital video camera.

Here the image capture range R is an appropriate range around the content output device 3, more specifically a range in which the content being outputted by the content output device 3 is viewable by passerby. Hence, in the example of FIGS. 2A and 2B, the passerby M1-M4 who are moving inside the image capture range R are possible viewers, while the passerby M5 who is moving outside the image capture range R is not a possible viewer. However, in a range closer to the content output device 3 within the image capture range R, more specifically a range separated from the installation position of the content output device 3 by a distance equal to or less than a given distance L (the range on the left side of the alternate long and two short dashes line within the image capture range R in FIGS. 2A and 2B) is a range in which both the first content and second content are easily viewed. On the other hand, a range far from the content output device 3, that is, a range separated from the content output device 3 by a distance more than the given distance L is a range where it is easy to view the first content, but it is difficult to view the second content.

The passerby M1 is not interested in the content being outputted by the content output device 3 at the first time shown in FIG. 2A. Such a passerby M1 is moving at a low speed (thick arrow S2) in the range near the content output device 3 at the first time, and is also moving at a low speed (thick arrow S2) at the second time shown in FIG. 2B like at the first time. The passerby M2 is interested in the content being outputted by the content output device 3 at the first time. Therefore, while the passerby M2 is moving at a high speed (thick arrow S1) in the range near the content output device 3 at the first time, he or she is moving at a lower speed (thick arrow S2) at the second time shown in FIG. 2B than the moving speed at the first time shown in FIG. 2A to focus on the content being outputted by the content output device 3.

As described above, at the second time shown in FIG. 2B, both the passerby M1 and M2 are moving at a low speed (thick arrow S2) at which it is easy for them to view the content being outputted by the content output device 3. However, the passerby M1 is a possible viewer who does not pay attention to the content, and the passerby M2 is a viewer. In other words, the accuracy of determination as to whether or not a passerby is a viewer is improved by determining whether or not the moving speed of a possible viewer is decreased rather than by determining whether or not the moving speed of the possible viewer is low. Moreover, the computational load is reduced because there is no need to execute complicated processing like the face recognition processing in order to determine whether or not a passerby is a viewer.

The passerby M3 is moving at a high speed (thick arrow S1) at the first time shown in FIG. 2A, and is also moving at a high speed (thick arrow S1) at the second time shown in FIG. 2B like at the first time shown in FIG. 2A. Thus, the passerby M3 whose moving speed is not decreased is a possible viewer who does not pay attention to the content. The passerby M4 is moving at a high speed (thick arrow S1) at the first time, but is moving at a lower speed (thick arrow S2) at the second time shown in FIG. 2B than the moving speed at the first time shown in FIG. 2A. However, the passerby M4 is moving in the range far from the content output device 3 at both the first time and the second time. Therefore, the passerby M4 is a possible viewer who does not pay attention to the content. The reason for the decrease in the moving speed of the passerby M4 is irrelevant to the content being outputted by the content output device 3.

In short, the accuracy of determination as to whether or not a passerby is a viewer is further improved by not only determining whether or not the moving speed of the viewer is decreased, but also determining whether the separation distance from a given position (in this case, the installation position of the content output device 3) to the viewer is equal to or less than the given distance L. In addition, for a possible viewer who is separated from the given position by a distance more than the given distance L, there is no need to determine whether or not he or she is a viewer by determining whether or not the moving speed is decreased (that is, it is possible to conclude that the possible viewer is not a viewer without making the determination), and therefore the computational load is further reduced.

Even if the passerby M4 is a viewer, it is difficult for the passerby M4 who is moving in the range far from the content output device 3 to view the second content. Hence, it is useless to determine that the passerby M4 is a viewer and provide the second content to the passerby M4. In other words, it is no problem to determine that the passerby M4 is not a viewer.

Note that the content output system 1 may be configured to make a determination as to whether or not a passerby is a viewer without taking the separation distance from the given position to the viewer into consideration. For example, if a possible viewer is able to easily view the first content or the second content outputted by the content output device 3 irrespective of the separation distance from the installation position of the content output device 3, it is not necessary to particularly consider the separation distance.

The storage device 4 illustrated in FIG. 1 includes a file server and stores the main body of each of a plurality of pieces of content (for example, a data file itself of content) to be outputted by the content output device 3. At the request of the output control device 5, the storage device 4 gives the requested content to the output control device 5. The storage device 4 is not limited to a file server, and may be a storage attached externally to or incorporated into the output control device 5.

The storage device 4 of this embodiment stores four pieces of first content C11-C14, and three pieces of second content C21, C22 and C24 (hereinafter the second content C21, C22 and C24 will be collectively referred to as the second content C21-C24). The first content C11 and the second content C21 correspond to each other, and the second content C21 indicates the details of advertising content of the first content C11. Similarly, the first content C12 (or the first content C14) and the second content C22 (or the second content C24) correspond to each other. There is no second content corresponding to the first content C13.

The output control device 5 includes a PC (personal computer), or general purpose apparatus such as a server, and comprises a CPU 50, a ROM 51, a RAM 52, an HDD 53, and an I/F section 54.

The I/F section 54 is an interface for connecting the output control device 5, the image capture device 2, the content output device 3, and the storage device 4 to each other with wires or wirelessly to enable communication. A captured image is inputted from the image capture device 2 through the I/F section 54. Content is given from the storage device 4 through the I/F section 54. The content is given to the content output device 3 through the I/F section 54.

The output control device 5, the image capture device 2, the content output device 3, and/or the storage device 4 are not necessarily connected directly with special wires, and may be connected to each other through a communication channel such as a LAN or the Internet. The image capture device 2, the content output device 3, the storage device 4 and/or the output control device 5 may be provided as a single unit. Further, it is also possible to configure a structure where the content is directly given from the storage device 4 to the content output device 3.

The CPU 50 is the control center of the output control device 5, uses the RAM 52 as a working area, controls the operation of each section of the device according to a computer program and data stored in the ROM 51 and HDD 53, and executes various kinds of processing. The HDD 53 is an auxiliary storage section of the output control device 5 where various kinds of computer programs and data are written and read by the CPU 50. Note that the output control device 5 is not limited to the HDD 53, and may be configured with an SSD.

Stored in a part of the storage area of the HDD 53 is a computer program 5*p* according to this embodiment of the present invention. The computer program 5*p* is stored in a removable recording medium and distributed, or distributed via a communication channel, and installed in the output control device 5. Or the computer program 5*p* is installed in the output control device 5 during the manufacture of the output control device 5.

Note that the computer program 5*p* is not limited to the structure where it is installed in the output control device 5 and then executed. The computer program 5*p* may be read from a removable recording medium or the distributer and directly executed.

In another part of the storage area of the HDD 53, captured images (not shown) inputted to the output control device 5 are stored in association with information indicating the order of the captured images (for example, the captured time at which the images were captured). In other part of the storage area of the HDD 53, a content table 5*a* is stored in advance. The content table 5*a* may be stored in the storage device 4, for example, if the recorded contents of the content table 5*a* are freely readable by the CPU 50.

Figure 3:
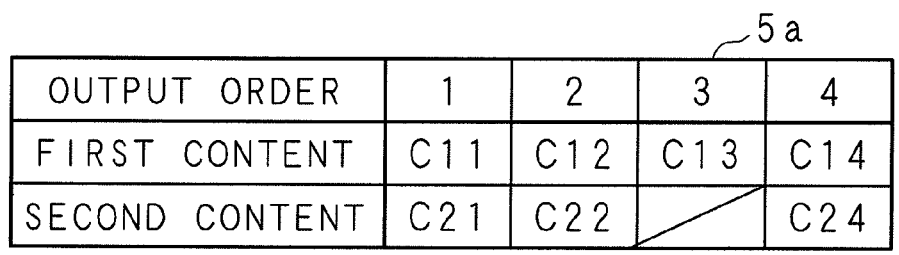
FIG. 3 is a schematic view illustrating one example of the content table stored on an HDD (hard disk) in an output control device according to Embodiment 1 of the present invention.

FIG. 3 is a schematic view illustrating one example of the content table 5*a* stored on the HDD 53. In the content table 5*a*, the output order of the first content C11-C14 and identification information of each of the first content C11-C14 and the second content C21-C24 (for example, the file names of data files of the content) are stored in association with each other.

With reference to the content table 5*a*, the output control device 5 controls the content output device 3 to switch and output the content. As a result, if there is no viewer, the content putout device 3 switches and outputs the first content C11, the first content C12, the first content C13, and the first content C14 in this order. When the output of the content C14 is completed, the content output device 3 starts to output the first content C11 again.

Next, the following will describe the case where there is a viewer. If a viewer appears while outputting the first content C11 (or the first content C12 or the first content C14), the content output device 3 switches from the first content C11 (or the first content C12 or the first content C14) to the corresponding second content C21 (or the second content C22 or the second content 24) and outputs the content. The content output device 3 continues to output the second content C21 (or the second content C22 or the second content 24) repeatedly while there is a viewer.

Thereafter, when no viewer is present, the content output device 3 switches from the second content being outputted to the first content which is to be outputted next to the first content corresponding to the second content being outputted. Therefore, for example, when there is no viewer, the content output device 3 which is outputting the second content C21 stops outputting the second content C21 and starts outputting the first content C12.

Note that the present invention is not limited to the structure where the second content C21 continues to be outputted repeatedly while there are viewers, and may be configured to start outputting the first content C12 after outputting the second content C21 a given number of times.

On the other hand, if the viewer appears while the first content C13 which does not have corresponding second content is being outputted, the content output device 3 continues to output the first content C13. The content output device 3 continues to output the first content C13 repeatedly while there is a viewer. Thereafter, when no viewer is present, the content output device 3 starts outputting the first content C14 after outputting the first content C13 completely.

Note that the present invention is not limited to the structure where the first content C13 continues to be outputted repeatedly while there is a viewer, and may be configured to start outputting the first content C14 after outputting the first content C13 a given number of times.

As described above, the first content being outputted is outputted completely irrespective of whether or not there is a viewer, but, when there is no viewer while outputting the second content, the output of the second content is interrupted and the content is switched to the first content. The reason for this is that it is useless to keep outputting the second content if there is no viewer.

Note that the present invention may also be configured so that when outputting the second content is started once, the second content continues to be outputted completely irrespective of whether or not there are viewers. Or the present invention may be configured so that if no viewer is present while the first content which does not have corresponding second content is being outputted, the outputting of the first content is interrupted and the content is switched to the next first content.

FIGS. 4A-4C are conceptual views for explaining the switching and outputting of content by the content output system 1. Time t11, t12, . . . , t16 in FIGS. 4A-4C satisfy a relationship t11<t12<. . . <t16.

FIG. 4A illustrates the case where there is no viewer. In this case, the content output device 3 outputs the first content C11 from time t11 to time t12, outputs the first content C12 from time t12 to time t13, outputs the first content C13 from time t13 to time t14, outputs the first content C14 from time t14 to time t15, and outputs the first content C11 from time t15 to time t16.

FIG. 4B illustrates the case where a viewer appears at time t21 satisfying the relationship t12<t21<t13, but no viewer is present at time t22 satisfying the relationship t14<t22<t15. In this case, the content output device 3 outputs the first content C12 from time t12, but repeatedly outputs the second content C22 from time t21 to time t22, and outputs the first content C13 from time t22.

FIG. 4C illustrates the case where a viewer appears at time t31 satisfying the relationship t13<t31<t14, but no viewer is present at time t32 satisfying the relationship t14<t32<t15. In this case, the content output device 3 outputs the first content C13 from time t13 to time t14, outputs the first content C13 again from time t14 to time t15, and outputs the first content C14 from time t15 to time t16.

Figure 5A:
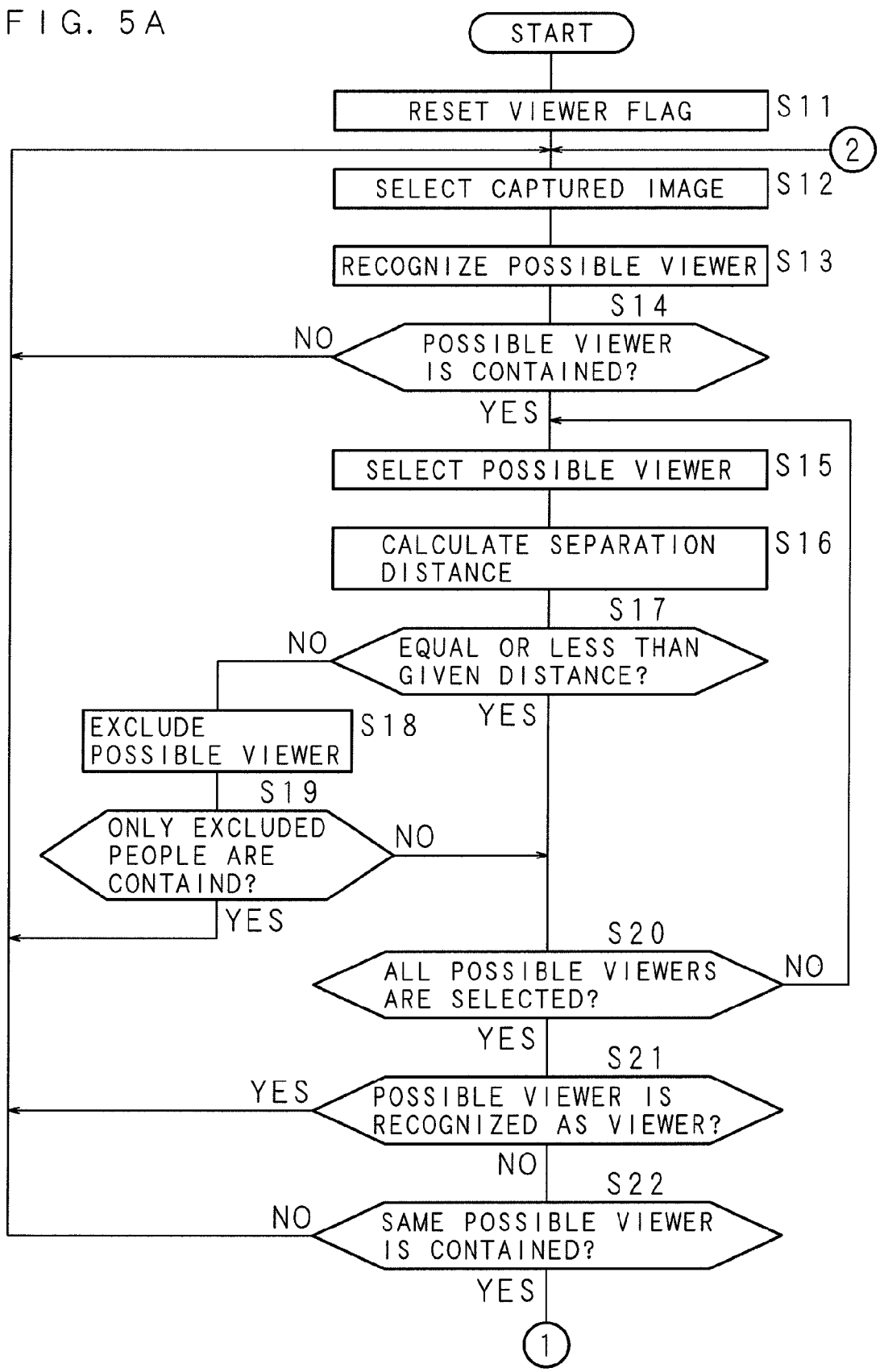
FIGS. 5A and 5B are a flowchart showing the procedure of viewer recognition processing to be executed by the output control device according to Embodiment 1 of the present invention.
Figure 5B:
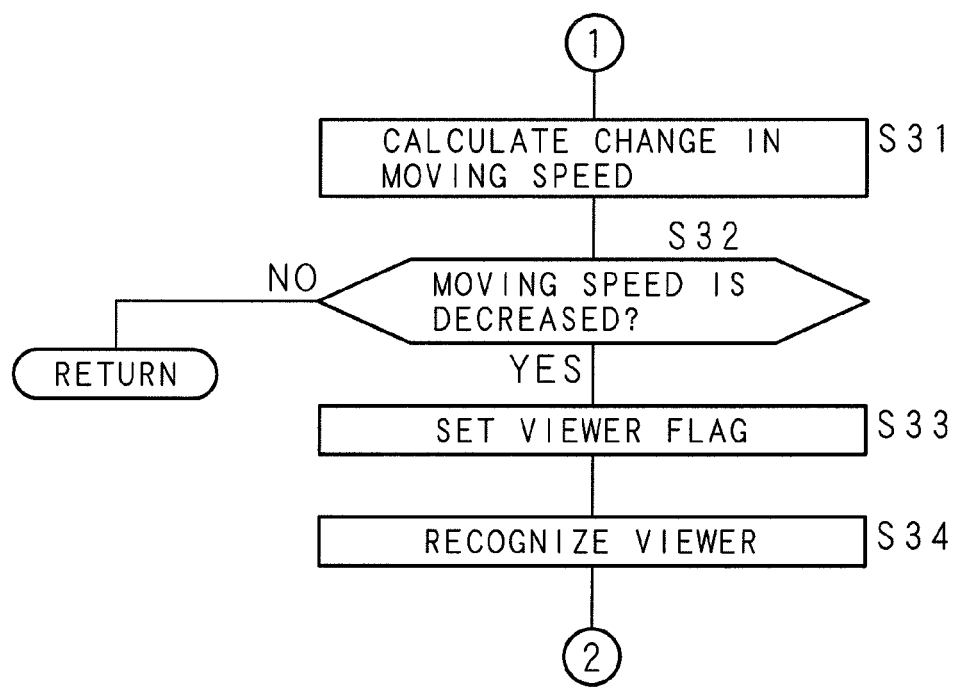

FIGS. 5A and 5B are a flowchart showing the procedure of viewer recognition processing to be executed by the output control device 5. In order to implement the viewer recognition processing, for example, the human tracking technique disclosed in the above-mentioned document "Real-time Human Tracking Using Ellipsoid Model" is applied.

First, the CPU 50 resets a viewer flag indicating whether or not there is a viewer (S11). The state in which the viewer flag is set (or reset) means there is a viewer (or there is no viewer). Next, the CPU 50 selects one piece of image on which a later-described process of step 13 has not been performed and which is the oldest among the captured images stored on the HDD 53 (S12). If captured images to be selected in S12 have not yet been stored on the HDD 53, the CPU 50 waits until the captured images are stored on the HDD 53.

Next, the CPU 50 performs possible-viewer recognition processing on the captured image selected in S12 (S13). For this, the CPU 50 calculates the difference between, for example, the captured image selected in S12 and a reference image stored in advance on the HDD 53. Here, the reference image is a captured image taken by the image capture image 2 when there was no possible viewer. Next, the CPU 50 determines, based on the result of the process of S13, whether or not the captured image selected in S12 contains possible viewers (S14). For this, the CPU 50 determines whether the difference between the captured image and the reference image calculated in S13, for example, is the difference indicating human. The CPU 50 which executes the process of S14 functions as a human determination section in this embodiment of the present invention.

If the captured image selected in S12 does not contain possible viewers (NO in S14), the CPU 50 returns the processing to S12. If the captured image selected in S12 contains possible viewers (YES in S14), the CPU 50 selects one person on which later-described processes in and after S16 have not been performed from the possible viewers contained in the captured image selected in S12 (S15).

Next, the CPU 50 calculates the separation distance between the possible viewer selected in S15 and the given position (S16). For this, for example, the CPU 50 scans pixels constituting the captured image, selects a representative pixel from the pixels constituting the image of the possible viewer selected in S15, counts the number of pixels which are present between the selected pixel and a given pixel, and converts the counting result into a separation distance by using a given distance conversion function or distance conversion table. The CPU 50 which executes the process of S16 functions as a distance calculation section in this embodiment of the present invention. Next, the CPU 50 determines whether the separation distance calculated in S16 is equal to or less than the given distance L (S17). The CPU 50 which executes the process of S17 functions as a distance determination section in this embodiment of the present invention.

If the separation distance calculated in S16 is equal to or less than the given distance L (YES in S17), the CPU 50 moves the processing to later-described S20. If the separation distance calculated in S16 exceeds the given distance L (NO in S17), the CPU 50 determines to exclude (or remove) the possible viewer selected in S15 from the subject of the following processes (S18). The possible viewers excluded by the process of S18 will be hereinafter referred to as the excluded people.

Next, the CPU 50 determines whether or not the captured image selected in S12 contains only the excluded people (S19). If the captured image selected in S12 contains only the excluded people (YES in S19), there is no possible viewer in a range near the content output device 3, and therefore the CPU 50 returns the processing to S12. If the captured image selected in S12 contains people other than the excluded people (that is, possible viewers who are not excluded, or possible viewers on which the processes in and after S16 have not been performed) (NO in S19), the CPU 50 moves the processing to S20.

The CPU 50 determines whether or not the possible viewers contained in the captured image selected in S12 were all selected in S15 (S20). If the captured image selected in S12 contains a possible viewer who has not yet been selected in S15 (NO in S20), the CPU 50 returns the processing to S15. If all of the possible viewers contained in the captured image selected in S12 have already been selected in S15 (YES in S20), the CPU 50 determines whether or not at least one person among the possible viewers contained in the captured image selected in S12 has already been recognized as a viewer by the previously executed process of S34 which will be described later (S21).

If there is at least one possible viewer who has been recognized as a viewer (YES in S21), the CPU 50 returns the processing to S12. The reason for this is that there is no need to reset the viewer flag because the viewer flag is set in the previously executed process of S33 which will be described later. If at least one possible viewer has not been recognized as a viewer (NO in S21), the CPU 50 determines whether or not all three consecutive captured images contain at least one same possible viewer (S22). Here the three consecutive captured images means the captured image selected in S12 this time, the captured image selected in S12 in the last time and the captured image selected in S12 in the time before the last time (that is, the captured images taken in the last two times before the captured image selected in S12 this time). Therefore, if the process of S12 was not executed three times or more, the CPU 50 automatically determines "NO" in S22.

If there are no three consecutive captured images, or if at least one image among the three consecutive captured images does not contain the same possible viewer (NO in S22), the CPU 50 returns the processing to S12 because it is unable to calculate a change in the moving speed of a possible viewer. If all of the three consecutive captured images contain at least one same possible viewer (YES in S22), the CPU 50 calculates a change in the moving speed of a possible viewer for each of the same possible viewers (S31). The CPU 50 which executes the process of S31 functions as a change calculation section in this embodiment of the present invention.

The CPU 50 in S31 calculates the moved distance for each possible viewer on the basis of two consecutive captured images (that is, the captured images selected in S12 this time and the last time and the captured images selected in S12 in the last two times) among the three consecutive captured images. Next, the CPU 50 calculates the current moving speed and the past moving speed of each possible viewer by dividing the calculated moved distance by the time interval of capturing images by the image capture device 2. Furthermore, the CPU 50 calculates a change in the moving speed of each possible viewer by subtracting the current moving speed from the past moving speed of the possible viewer.

After completing the process of S31, the CPU 50 determines whether or not the moving speed of at least one possible viewer is decreased (S32). However, when the change in the moving speed calculated in S31 indicates a decrease equal to or more than a given percentage of the moving speed, the CPU 50 in S32 determines that the moving speed is decreased. More specifically, for example, when the past moving speed is 4 km per hour and the current moving speed is 5 km per hour (or 4 km per hour), the result of subtraction for the moving speeds is a negative value (or "0"). Therefore, it is considered that the possible viewer moved at an increased speed (or moved at the equal speed). In this case, the CPU 50 determines that the change in the moving speed calculated in S31 does not indicate a decrease in the moving speed.

For example, in the case where the past moving speed is 4 km per hour and the current moving speed is 3 km per hour or 2 km per hour (or 0 km per hour), the result of subtraction for the moving speeds is a positive value. Therefore, it is considered that the possible viewer moved at a reduced speed (or stopped). When the result of subtraction for the moving speeds is a positive value, the CPU 50 calculates the deceleration rate of the possible viewer. The deceleration rate is a percentage given by dividing the result of subtraction for the moving speeds by the past moving speed. The deceleration rate in this example is 25% (=$\{4-3\}/4\times100$), 50% (=$\{4-2\}/4\times100$), or 100% (=$\{4-0\}/4\times100$).

If a given percentage as a determination criterion is 50%, when the past moving speed is 4 km per hour and the current moving speed is 2 km per hour or 0 km per hour (or 3 km per hour), the CPU 50 determines that the change in the moving speed calculated in S31 indicates a decrease in the moving speed (or does not indicate a decrease in the moving speed). The CPU 50 which executes the process of S32 functions as a speed determination section in this embodiment of the present invention.

If the moving speed of the possible viewer is not decreased (NO in step S32), no viewer is present. Therefore, the CPU 50 returns the processing to S11. As a result, the viewer flag is reset. On the other hand, if the moving speed of at least one possible viewer is decreased (YES in step S32), a viewer is present. Therefore, the CPU 50 sets the viewer flag (S33), recognizes the possible viewer whose moving speed is decreased as a viewer (S34), and then returns the processing to S12.

Figure 6A:
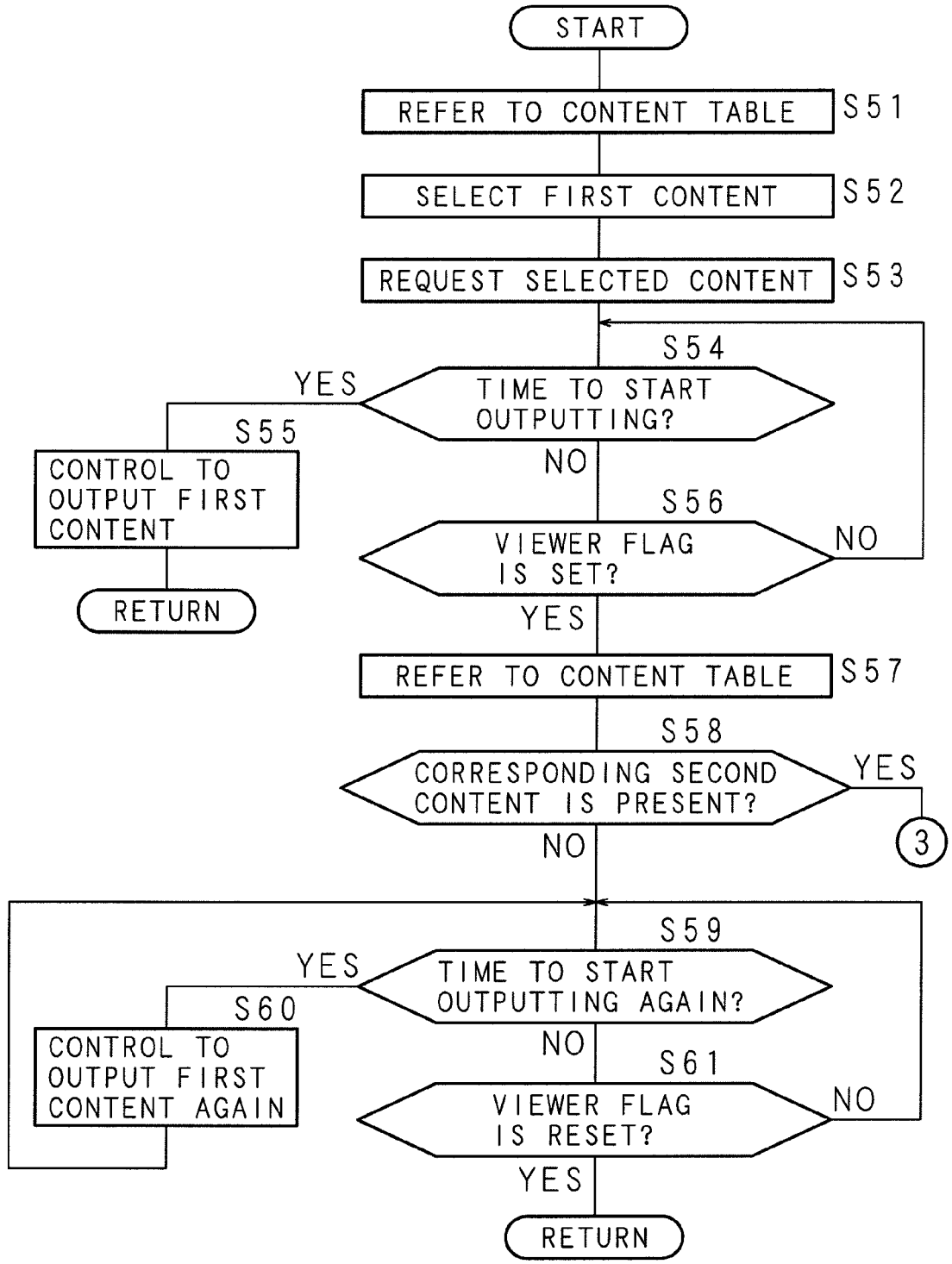

FIGS. 6A and 6b are a flowchart showing the procedure of output control processing to be executed by the output control device 5. This output control processing is executed in parallel with the viewer recognition processing illustrated in FIGS. 5A and 5B after the process of S11 is executed for the first time. The CPU 50 which executes the output control processing functions as an output control section in this embodiment of the present invention.

First, the CPU 50 refers to the content table 5a (S51), and selects the first content to be outputted by the content output device 3 (S52). If the content output device 3 has not outputted any content yet, the first content to be selected in S52 is the first content C11. On the other hand, if the content output device 3 is outputting, for example, the first content C11 (or the first content C14), the first content to be selected in S52 is the first content C12 (or the first content C11).

After completing the process of S52, the CPU 50 requests the storage device 4 for the first content selected in S52 (S53). At this time, the storage device 4 gives the requested first content to the output control device 5. Next, the CPU 50 determines whether or not it is the time to start outputting the first content selected in S52 (S54). If the content output device 3 has not outputted any content yet, the CPU 50 in S54 immediately determines "YES". On the other hand, if the content output device 3 is outputting, for example, the first content, the CPU 50 in S54 determines "YES" at the time of completing the output of the first content being outputted.

If it is the time to start outputting the first content selected in S52 (YES in S54), the CPU 50 causes the content output device 3 to output the first content selected in S52 (S55). At this time, the CPU 50 gives the first content data obtained from the storage device 4 as a result of the process of S53 to the content output device 3. Then, the CPU 50 returns the processing to S51 while continuing the output control of the first content executed in S55. With the repetition of the processes of S51-S55, the content output device 3 sequentially switches and outputs the first content C11-C14.

If it is not the time to start outputting the first content selected in S52 (NO in S54), the CPU 50 determines whether or not the viewer flag is set (S56). If the viewer flag is reset (NO in S56), the CPU 50 returns the processing to S54. If the viewer flag is set (YES in S56), the CPU 50 refers to the content table 5a (S57), and determines whether there is second content corresponding to the first content being currently outputted by the content output device 3 (S58). If the content output device 3 is outputting the first content C13 (or the first content other than the first content C13), the CPU 50 determines "NO" (or YES) in S58.

If there is no second content corresponding to the first content being currently outputted (NO in S58), the CPU 50 determines whether it is the time to start outputting again the first content being currently outputted (specifically the first content C13) (S59). In S54, the CPU 50 determines "YES" at the time of completing the output of the first content being currently outputted. If it is the time to start outputting again the first content (YES in S59), the CPU 50 causes the content output device 3 to output again the first content being outputted (S60).

Then, the CPU 50 returns the processing to S59 while continuing the control of output again of the first content executed in S60. With the repetition of the processes of S59 and S60, the content output device 3 repeatedly outputs the same first content.

If it is not the time to start outputting again the first content (NO in S59), the CPU 50 determines whether or not the viewer flag is reset (S61). If the viewer flag is set (NO in S61), the CPU 50 returns the processing to S59. If the viewer flag is reset (YES in S61), the CPU 50 returns the processing to S51. Thereafter, in the process of S52, the next first content (specifically, the first content C14) to be outputted after the first content being currently outputted is selected.

If there is second content corresponding to the first content being currently outputted (YES in S58), the CPU 50 requests the storage device 4 for the corresponding the second content (S71). At this time, the storage device 4 gives the requested second content to the output control device 5.

Next, the CPU 50 causes the content output device 3 to interrupt the output of the first content being currently outputted (S72), and further causes the content output device 3 to output the corresponding second content (S73). At this time, the CPU 50 gives the second content data obtained as a result of the process of S71 from the storage device 4 to the content output device 3.

Then, the CPU 50 moves the processing to S74 while continuing the control of output of the second content executed in S73. With the execution of the processes of S72 and S73, the content output device 3 outputs the second content instead of the first content.

The CPU 50 determines whether or not the viewer flag is reset (S74). If the viewer flag is set (NO in S74), the CPU 50 determines whether it is the time to start outputting again the second content being currently outputted (S75). In S75, the CPU 50 determines "YES" at the time of completing the output of the second content being currently outputted.

If it is the time to start outputting again the second content (YES in S75), the CPU 50 causes the content output device 3 to output again the second content being outputted (S76). Then, the CPU 50 moves the processing to S74 while continuing the control of output of the second content executed in S76. With the repetition of the processes of S75 and S76, the content output device 3 repeatedly outputs the same second content.

If it is not the time to start outputting again the second content (NO in S75), the CPU 50 returns the processing to S74. If the viewer flag is reset (YES in S74), the CPU 50 refers to the content table 5a (S77), and selects the first content to be outputted by the content output device 3 (S78). The first content to be selected in S78 is the first content next to the first content corresponding to the second content being currently outputted.

Next, the CPU 50 requests the storage device 4 for the first content selected in S78 (S79). At this time, the storage device 4 gives the requested first content to the output control device 5. Next, the CPU 50 causes the content output device 3 to interrupt the output of the second content being currently outputted (S80), and further causes the content output device 3 to output the first content selected in S78 (S81). At this time, the CPU 50 gives the first content data obtained as a result of process of S79 from the storage device 4 to the content output device 3.

Then, the CPU 50 returns the processing to S51 while continuing the control of output of the first content executed in S81. With the execution of the processes of S80 and S81, the content output device 3 outputs the first content instead of the second content.

The content output system 1 as described above is capable of accurately determining whether or not there is a viewer without increasing the computational load, and is further capable of providing appropriate content to the viewer, or a possible viewer who is not paying attention to content, according to whether or not there is a viewer.

Embodiment 2

Figure 7:
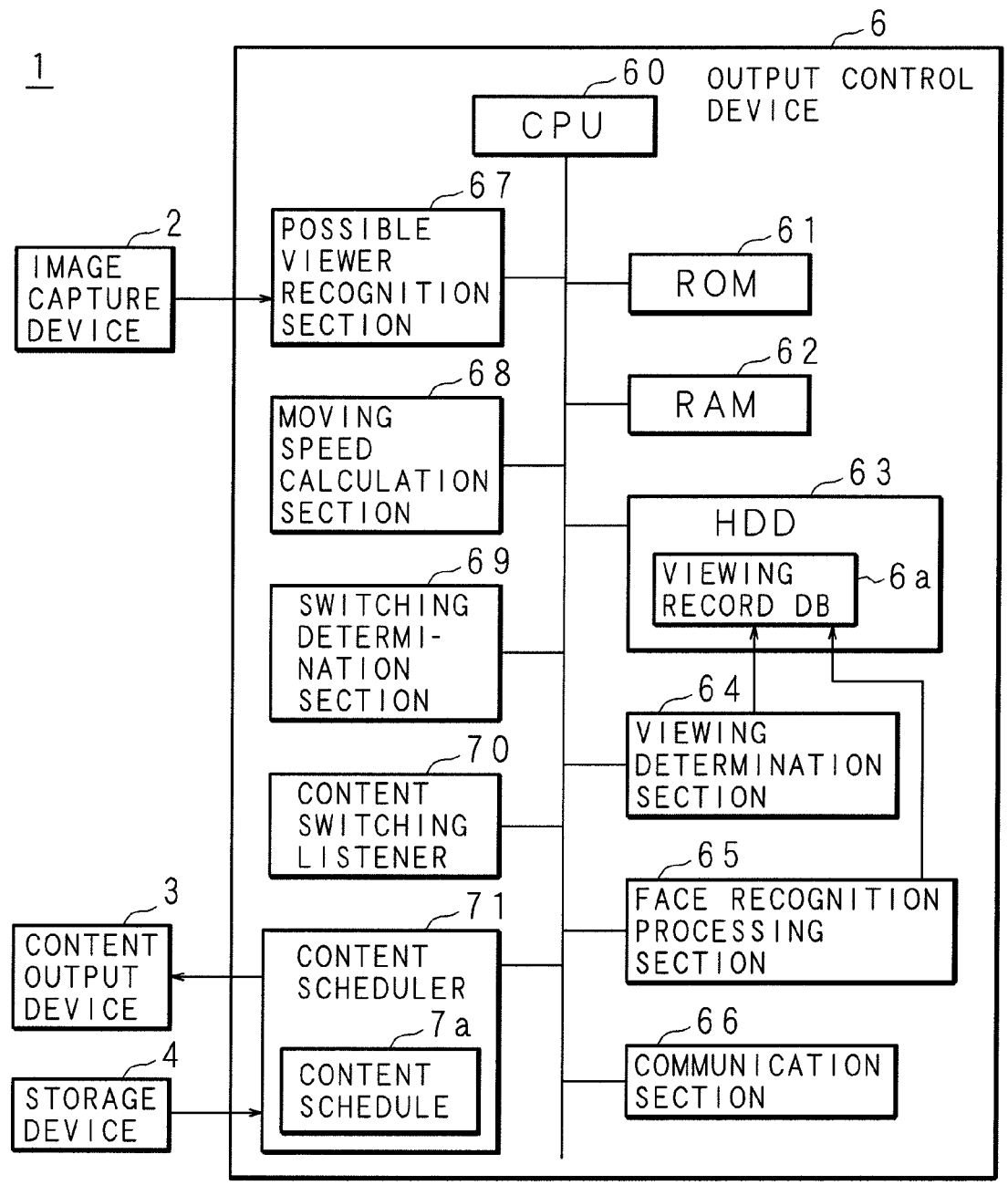
FIG. 7 is a block diagram illustrating the configuration of a content output system according to Embodiment 2 of the present invention.

FIG. 7 is a block diagram illustrating the configuration of a content output system 1 according to Embodiment 2 of the present invention. The content output system 1 comprises an image capture device 2, a content output device 3, a storage device 4, and an output control device 6. While the output control device 5 of Embodiment 1 implements an output control method of an embodiment of the present invention by software, the output control device 6 of this embodiment implements the output control method of the embodiment of the present invention by hardware. Other parts corresponding to those of Embodiment 1 are designated with the same reference numbers and the explanation thereof will be omitted.

The output control device 6 is a device exclusively used for the content output system 1, and comprises a CPU 60, a ROM 61, a RAM 62, an HDD 63, a viewing determination section 64, a face recognition processing section 65, a communication section 66, a possible viewer recognition section 67, a moving speed calculation section 68, a switching determination section 69, a content switching listener 70, and a content scheduler 71. The CPU 60 is the control center of the output control device 6, uses the RAM 62 as a working area, controls the operation of each section of the device according to a computer program and data stored in the ROM 61 and HDD 63, and executes various kinds of processing.

The HDD 63 is an auxiliary storage section of the output control device 6 where various kinds of computer programs and data are written and read by the CPU 60. Note that the output control device 6 is not limited to the HDD 63, and may be configured with an SSD. In a part of the storage area of the HDD 63, a viewing record DB6a is stored. FIG. 8 is a schematic view illustrating one example of the viewing record DB 6b.

In the viewing record DB 6a, identification information about each of the first content C11-C14, the number N1-N4 of viewers recognized as viewers while the content output device 3 was outputting each of the first content C11-C14, and face images I11, I12, . . . , –I41, I42, . . . of the viewers are stored in association with each other.

Note that features (sex or age group etc.) of viewers computed based on the face images I11, I12, . . . , –I41, I42, . . . , respectively, may be stored instead of the face images I11, I12, . . . , –I41, I42, . . . , or together with the face images I11, I12, . . . , –I41, I42, in the viewing record DB 6a.

The number of viewers and the face images of the viewers (or the features of the viewers) function as viewing information in this embodiment. Captured images taken by the image capture device 2 are given in a time sequence to the possible viewer recognition section 67.

The possible viewer recognition section 67 performs possible viewer tracking processing using the human tracking technique disclosed in Non-patent Document 1 on the given captured images. The possible viewer recognition section 67 recognizes a plurality of possible viewers and tracks each of the recognized possible viewers. Such a possible viewer recognition section 67 functions as a human determination section in this embodiment of the present invention. The moving speed calculation section 68 calculates the moving speed of each of the possible viewers recognized by the possible viewer recognition section 67.

The switching determination section 69 calculates a deceleration rate of each possible viewer on the basis of the moving speed calculated by the moving speed calculation section 68, and determines, on the basis of the calculated deceleration rate and the separation distance from a given position to the possible viewer, whether or not to switch the content. Such a switching determination section 69 functions as a change calculation section, a speed determination section, a distance calculation section, and a distance determination section in this embodiment of the present invention.

On the basis of the result of determination by the switching determination section 69, the content switching listener 70 requests the content scheduler 71 to switch from the first content to the second content (hereinafter referred to as "switching from first to second content"), or from the second content to the first content (hereinafter referred to as "switching from second to first content"). Here, switching from first to second content is requested when a viewer appears. Switching from second to first content is requested when no viewers are present.

A pre-edited content schedule 7a is stored in the content scheduler 71. The content scheduler 71 usually obtains the first content C11-C14 according to the content schedule 7a, and causes the content output device 3 to switch and output the first content C11-C14 in sequence. When switching from first to second content is requested from the content switching listener 70, the content scheduler 71 sends a query to the storage device 4 to confirm the presence or absence of second content corresponding to the first content being currently outputted.

If the corresponding second content is present, the content scheduler 71 causes the content output device 3 to output the second content instead of the first content being currently outputted. If the corresponding second content is not present, the content scheduler 71 causes the content output device 3 to repeatedly output the first content being currently outputted until the content switching listener 70 makes a request for switching from second to first content, that is, during a period in which a viewer is present.

When the content switching listener 70 makes a request for switching from second to first content while the second content is being outputted, the content scheduler 71 causes the control output device 3 to switch and output the first content instead of the second content being currently outputted. Thereafter, the content switching listener 70 causes the content output device 3 to switch and output the first content C11-C14 in sequence as usual according to the content schedule 7a.

When the content switching listener 70 makes a request for switching from second to first content while the first content having no corresponding second content is being outputted, the content scheduler 71 causes the control output device 3 to switch and output the first content C11-C14 in sequence as usual according to the content schedule 7a. The content scheduler 71 as described above functions as the output control section in this embodiment.

The viewing determination section 64 calculates the deceleration rate of each possible viewer on the basis of the moving speed calculated by the moving speed calculation section 68, and determines whether or not each possible viewer is a viewer on the basis of the calculated deceleration rate and the separation distance from the given position to the possible viewer, and stores the number of people determined to be viewers in the viewing record DB 6*a* in association with the first content which was being outputted when the viewers appeared. Such a viewing determination section 64 functions as a change calculation section, a speed determination section, a distance calculation section, a distance determination section, and a recording section in this embodiment of the present invention.

The face recognition processing section 65 performs known face recognition processing on an area containing a possible viewer who was determined to be a viewer by the viewing determination section 64 within a captured image. Next, the face recognition processing section 65 stores the face image of the viewer as a result of the recognition processing in the viewing record DB 6*a* in association with the first content which was being outputted when the viewer appeared. Such a face recognition processing section 65 functions as a face recognition section and a recording section in this embodiment. Note that the recording section and/or the face recognition section may be implemented by software.

The content output system 1 as described above provides effects similar to the content output system 1 of Embodiment 1. Moreover, there is no need to perform face recognition processing on an entire captured image to obtain the face images of viewers. Hence, the computational load is reduced while executing the face recognition processing which is in general complex.

Furthermore, it is possible to utilize the data stored in the viewing record DB 6*a* to evaluate the advertising effect of each of the first content C11-C14. For example, viewing measurement for each of the first content C11-C14 is simply calculated on the basis of the number N1-N4 of viewers and the total number of passerby. Thus, the data stored in the viewing record DB 6*a* is sent timely by the communication section 66 to a communication device possessed by the administrator of the content output system 1.

Note that, in Embodiments 1 and 2, the content output system 1 may be configured without the second content. In this case, the first content is repeatedly outputted during a period in which a viewer is present. In Embodiment 2, the output control device 6 may be configured without the switching determination section 69 and the content switching listener 70. In this case, the first content C11-C14 are sequentially switched and outputted according to the content schedule 7*a*, irrespective of the presence and absence of viewer. However, even in this case, the number of viewers and the face images of viewers are stored in the viewing record DB 6*a*.

The embodiments disclosed here are illustrated examples and should not be regarded as restrictive in all aspects. The scope of the invention is not limited to the above descriptions and is intended to cover all changes that fall within the scope of the claims, or equivalence of the scope of the claims.

In addition, the content output system 1 and/or the output control devices 5 and 6 may include components which are not disclosed in Embodiments 1 and 2 as long as the effects of the present invention are provided.

As this description may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A content output system comprising:
an image capture device;
a storage device storing a plurality of pieces of content whose video matters are different from each other;
a content output device for outputting content stored in the storage device; and
an output control device for controlling switching and outputting of the content in the content output device, based on images which are captured by the image capture device and inputted in a time sequence to the output control device,
wherein the output control device includes:
a human determination section for determining, based on the images, whether or not the images contain a person;
a change calculation section for calculating, when the human determination section determines that the images contain a person, a change in a moving speed of the person contained in the images;
an output control section for selecting content which includes a different video matter according to a result of calculation by the change calculation section and a result of determination by the human determination section from the plurality of pieces of content stored in the storage device and causing the content output device to output the selected content; and
a speed determination section for determining whether or not the result of calculation by the change calculation section indicates a decrease in the moving speed;
wherein the output control section includes:
a first output section for outputting first content when the human determination section or the speed determination section determines NO, and
a second output section for outputting second content different from the first content, instead of the first content, when the speed determination section determines that a result of calculation by the change calculation section indicates a decrease in the moving speed of at least one person.

2. An output control device for controlling switching and outputting of a plurality of pieces of content whose video matters are different from each other in an external device, based on images which are inputted in a time sequence to the output control device, comprising:
a human determination section for determining, based on the images, whether or not the images contain a person;
a change calculation section for calculating, when the human determination section determines that the images contain a person, a change in a moving speed of the person contained in the images;
an output control section for selecting and outputting content which includes a different video matter according to a result of calculation by the change calculation section and a result of determination by the human determination section; and
a speed determination section for determining whether or not the result of calculation by the change calculation section indicates a decrease in the moving speed;
wherein the output control section includes:
a first output section for outputting first content when the human determination section or the speed determination section determines NO, and
a second output section for outputting second content different from the first content, instead of the first content, when the speed determination section determines that a result of calculation by the change calculation section indicates a decrease in the moving speed of at least one person.

3. The output control device of claim 2, wherein when the result of calculation by the change calculation section indicates a decrease equal to more than a given percentage of the moving speed, the speed determination section determines that the result of calculation by the change calculation section indicates a decrease in the moving speed.

4. The output control device of claim 2, further comprising:
a distance calculation section for calculating, when the human determination section determines that the images contain a person, a distance from a given position to the person; and
a distance determination section for determining whether or not a result of calculation by the distance calculation section is equal to or less than a given distance,
wherein when the distance determination section determines that a result of calculation by the distance calculation section is equal to or less than the given distance for the person, the change calculation section executes the calculation.

5. The output control device of claim 2, further comprising a recording section for recording, when there is a person for which the result of calculation by the change calculation section indicates a decrease in the moving speed, viewing information about viewing of content by the person.

6. The output control device of claim 5, further comprising a face recognition section for recognizing a face of the person for which the result of calculation by the change calculation section indicates a decrease in the moving speed, based on the images,
wherein the recording section includes information based on a result of recognition by the face recognition section in the viewing information to be recorded.

7. An output control method for controlling an output control device to switch and output a plurality of pieces of content whose video matters are different from each other in an external device, based on images which are inputted in a time sequence to the output control device, comprising the steps of:
when the images contain a person, calculating a change in a moving speed of the person contained in the images;
selecting and outputting content which includes a different video matter according to a result of calculation of the change and whether or not the images contain a person, and
determining whether or not the change in the moving speed indicates a decrease in the moving speed;
outputting first content when the images do not contain a person or when it is determined that the change in the moving speed does not indicate a decrease in the moving speed; and
outputting second content different from the first content, instead of the first content, when it is determined that the change in the moving speed indicates a decrease in the moving speed of at least one person.

8. A non-transitory recording medium storing a computer program for causing a computer to control switching and outputting of a plurality of pieces of content whose video matters are different from each other in an external device, based on images which are inputted in a time sequence to the computer, said computer program comprising:
a human determination step for causing the computer to determine, based on the images, whether or not the images contain a person;
a change calculation step for causing the computer to calculate a change in a moving speed of a person contained in the images when a determination is made in the human determination step that the images contain a person;
an output control step for causing the computer to select and output content which includes a different video matter according to a result of calculation in the change calculation step and a result of determination in the human determination step; and
a speed determination step for causing the computer to determine whether or not the result of calculation by the change calculation step indicates a decrease in the moving speed;
wherein the output control step includes:
a first output step for causing the computer to output first content when NO is determined by the human determination step or the speed determination step, and
a second output step for causing the computer to output second content different from the first content, instead of the first content, when it is determined by the speed determination step that a result of calculation by the change calculation step indicates a decrease in the moving speed of at least one person.

* * * * *